United States Patent
Vick et al.

(10) Patent No.: US 8,281,296 B2
(45) Date of Patent: *Oct. 2, 2012

(54) CROSS-ISA INLINING IN A SYSTEM VIRTUAL MACHINE

(75) Inventors: Christopher A. Vick, San Jose, CA (US); Gregory M. Wright, Mountain View, CA (US); Mario I. Wolczko, San Carlos, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1063 days.

This patent is subject to a terminal disclaimer.

(21) Appl. No.: 12/190,490

(22) Filed: Aug. 12, 2008

(65) Prior Publication Data

US 2010/0042983 A1 Feb. 18, 2010

(51) Int. Cl.
*G06F 9/45* (2006.01)
(52) U.S. Cl. ........ 717/152; 717/151; 717/153; 717/132; 717/133; 711/163; 713/167
(58) Field of Classification Search .................. None
See application file for complete search history.

(56) References Cited

U.S. PATENT DOCUMENTS

| | | | | |
|---|---|---|---|---|
| 5,276,881 A * | 1/1994 | Chan et al. | 717/147 |
| 5,761,477 A * | 6/1998 | Wahbe et al. | 718/1 |
| 6,085,029 A * | 7/2000 | Kolawa et al. | 714/38.13 |
| 6,161,217 A * | 12/2000 | Detlefs et al. | 717/141 |
| 6,223,340 B1 * | 4/2001 | Detlefs | 717/145 |
| 6,397,379 B1 * | 5/2002 | Yates et al. | 717/140 |
| 6,609,248 B1 * | 8/2003 | Srivastava et al. | 717/147 |
| 6,760,907 B2 * | 7/2004 | Shaylor | 717/158 |
| 7,490,320 B2 * | 2/2009 | Kielstra et al. | 717/148 |
| 7,530,059 B2 * | 5/2009 | Kielstra et al. | 717/148 |
| 7,536,682 B2 * | 5/2009 | Dankel et al. | 717/139 |
| 7,543,284 B2 * | 6/2009 | Bolton et al. | 717/157 |
| 7,552,426 B2 * | 6/2009 | Traut | 717/138 |
| 7,913,240 B2 * | 3/2011 | Kielstra et al. | 717/148 |
| 7,941,791 B2 * | 5/2011 | Wang et al. | 717/140 |
| 8,006,204 B2 * | 8/2011 | Killian et al. | 716/100 |
| 8,176,475 B2 * | 5/2012 | Kosche et al. | 717/127 |
| 2002/0147969 A1 * | 10/2002 | Lethin et al. | 717/138 |

(Continued)

OTHER PUBLICATIONS

Title: Information Flow Certification Using an Intermediate Code Program Representation, author: Mennie, A.L er al, source: IEEE, dated: 1981.*

(Continued)

*Primary Examiner* — Chameli Das
(74) *Attorney, Agent, or Firm* — Park, Vaughan, Fleming & Dowler LLP

(57) ABSTRACT

A system and method are provided for inlining a program call between processes executing under separate ISAs (Instruction Set Architectures) within a system virtual machine. The system virtual machine hosts any number of virtual operating system instances, each of which may execute any number of applications. The system virtual machine interprets or dynamically compiles not only application code executing under virtual operating systems, but also the virtual operating systems. For a program call that crosses ISA boundaries, the virtual machine assembles an intermediate representation (IR) graph that spans the boundary. Region nodes corresponding to code on both sides of the call are enhanced with information identifying the virtual ISA of the code. The IR is optimized and used to generate instructions in a native ISA (Instruction Set Architecture) of the virtual machine. Individual instructions are configured and executed (or emulated) to perform as they would within the virtual ISA.

15 Claims, 3 Drawing Sheets

U.S. PATENT DOCUMENTS

| | | | | |
|---|---|---|---|---|
| 2003/0101334 | A1* | 5/2003 | Desoli | 712/227 |
| 2006/0206880 | A1* | 9/2006 | Barraclough et al. | 717/140 |
| 2006/0259878 | A1* | 11/2006 | Killian et al. | 716/1 |
| 2007/0106983 | A1* | 5/2007 | Owen et al. | 717/136 |
| 2008/0256330 | A1* | 10/2008 | Wang et al. | 712/24 |
| 2009/0150890 | A1* | 6/2009 | Yourst | 718/102 |
| 2009/0193404 | A1* | 7/2009 | Kielstra et al. | 717/148 |

OTHER PUBLICATIONS

Adams, Keith et al., A Comparison of Software and Hardware Techniques for x86 Virtualization, ASPLOS '06, Oct. 21-25, 2006, San Jose, CA, USA, ACM Press.

Smith, James E. et al., "Virtual Machines: Versatile Platforms for Systems and Processes", Morgan Kaufmann, 2005, pp. 9-13, 17-22, 169-171, 333-337, 402-404.

Weaver, David L. et al., "The SPARC Architecture Manual", Version 9, Prentice Hall, 1994.

Paleczny, Michael et al., "The Java HotSpot Server Compiler", Proceedings of the Java (TM) Virtual Machine Research and Technology Symposium (JVM '01) USENIX Apr. 23-24, 2001.

Xen Interface Manual, Xen v2.0 for x86, http://xen.org/files/xen_interface.pdf., downloaded Aug. 21, 2008.

* cited by examiner

Format 310

Format 320

Format 330 ated Aug. 2008.
CROSS-ISA INLINING IN A SYSTEM VIRTUAL MACHINE

RELATED APPLICATION

The subject matter of this application is related to the subject matter in a co-pending non-provisional application, Ser. No. 12/190,498, entitled "CROSS-DOMAIN INLINING IN A SYSTEM VIRTUAL MACHINE" and filed 12 Aug. 2008.

BACKGROUND

This invention relates to the field of computer systems. More particularly, a system and methods are provided for inlining across protection domain boundaries within a system virtual machine.

A system virtual machine (VM) executes instructions from a source or "virtual" instruction set architecture (vISA), such as the x86 ISA, on a "native" ISA (nISA), such as SPARC®, by interpretation or dynamic compilation. Use of a virtual machine thus allows one physical computing device to appear to host one or more virtual computers, which can execute a variety of operating systems and application software.

A VM awards a system designer great freedom in design within the nISA. In particular, in traditional non-virtual machine computer systems a processor executes instructions essentially one at a time, using only local knowledge of the current process. A VM, however, can apply optimizations across greater regions of a program, including inlining, whereby instructions from the target of a function call are compiled into, and optimized with, the source of the call. Currently, however, inlining can only be performed for function calls fully contained within the boundaries of one protection domain—a combination of privilege level and applicable address space.

However, many application workloads involve a wealth of system calls (e.g., calls from application code into the operating system), especially for input/output (I/O). For example, in some hypervisor-based systems (e.g., Xen®), I/O follows a complicated path from an application to the operating system's stub device driver via a system call, then via a hypercall to the real device driver running in another guest OS instance.

All these protection domain transitions (e.g., user to system to hypervisor to system) are expensive on conventional (non-system virtual machine) hardware. For example, in response to a trap or software interrupt from application code, among other operations some or all of the following actions occur: a processor's pipeline is flushed, control registers are modified, internal state (i.e., context) of the processor is reconfigured to raise the privilege level to supervisor mode from user mode, information about the user context is saved, and control is transferred to an appropriate service routine. Yet, abstractly, system calls/hypercalls are similar to function calls except that they call across a protection domain boundary.

Similarly, inlining cannot be performed when a call is made from a process executing in one ISA to a process executing in a different ISA. For example, a given VM may host guest operating systems that differ from each other in terms of their ISA (e.g. SPARC, x86), but which must cooperate as described above to share a real device driver. Not only do the protection domain boundaries present obstacles, but the difference in vISAs further frustrates efforts to inline calls between the guest operating systems.

SUMMARY

In one embodiment of the invention, a system and method are provided for inlining and optimizing a program call across an ISA (Instruction Set Architecture) boundary within a system virtual machine. In particular, a call between one process executing under one virtual ISA (or vISA) and another process executing under a different vISA can be optimized, regardless of the different instruction formats and associated behavior.

In this embodiment, during dynamic compilation or translation, the intermediate representation (IR) of a sequence of code comprising the call is modified to associate with a region node of the IR the vISA of the corresponding code. The IR is subsequently used to generate native ISA (or nISA) instructions to be executed or emulated by the virtual machine, at which time the vISA information is used to ensure the nISA instructions are configured with the correct semantics and behavior.

In another embodiment of the invention, inlining can be performed for a call across a boundary separating one protection domain from another, regardless of whether the call also crosses an ISA boundary. A protection domain comprises a combination of a privilege level and memory address space.

In this embodiment, when a program call to be optimized crosses a protection domain boundary, the virtual machine assembles an intermediate representation (IR) graph that spans the boundary. Region nodes corresponding to code on both sides of the call are enhanced with information identifying the applicable protection domains.

The IR is optimized and used to generate instructions in a native ISA (Instruction Set Architecture) of the virtual machine. Individual instructions reveal the protection domain in which they are to operate, and instructions corresponding to different domains may be interleaved.

In some embodiments of the invention, the system virtual machine interprets or dynamically compiles not only application code executing under guest operating systems, but also the guest operating systems themselves. This promotes the ability to observe behavior on both sides of a system call (e.g., user level and supervisor level) and facilitates optimization of the call.

DETAILED DESCRIPTION

Figure 1:
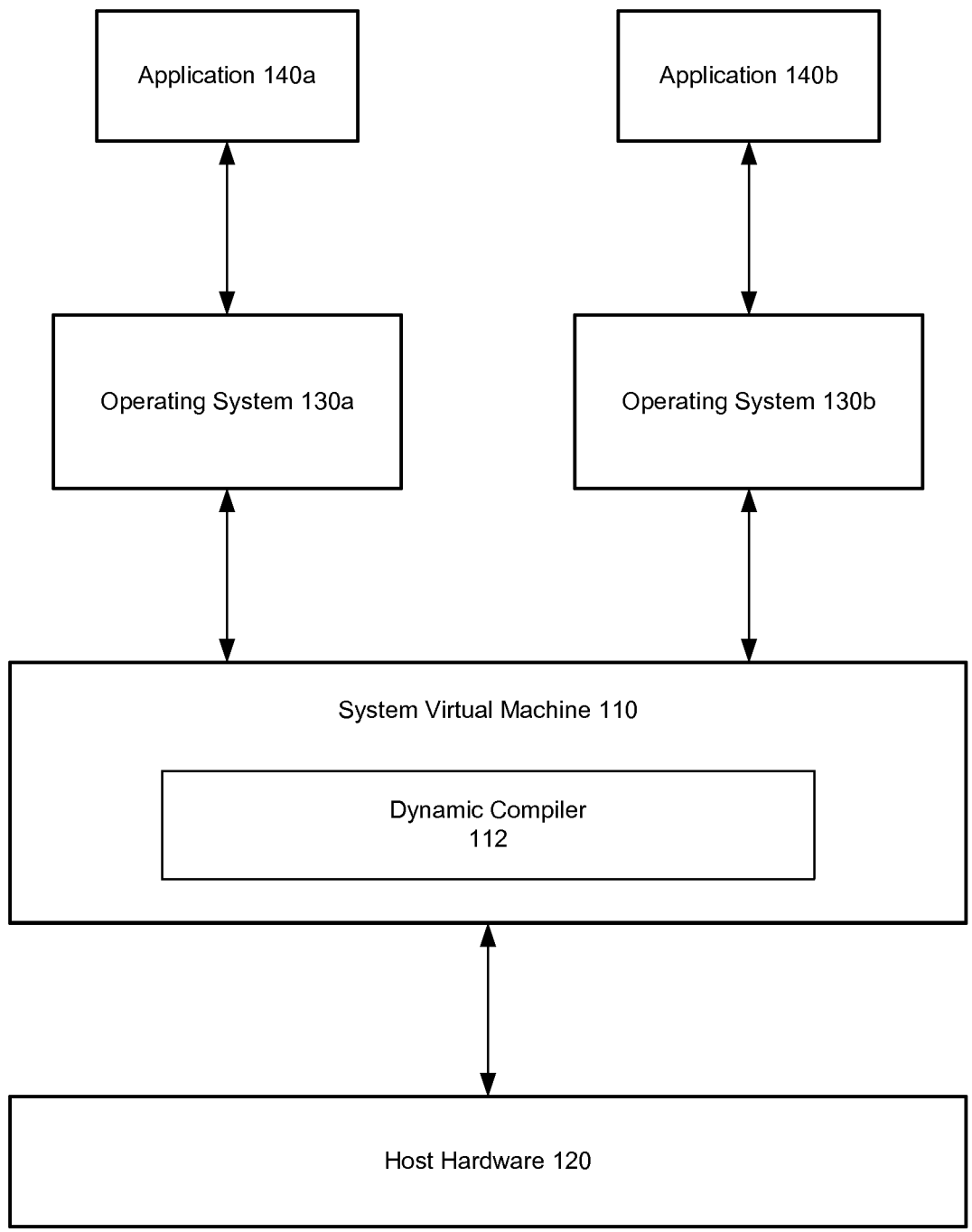
FIG. 1 is a block diagram depicting a virtual machine computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In one embodiment of the invention, a system and methods are provided for inlining across protection domain boundaries with a system virtual machine or VM. In this embodiment, a protection domain comprises a privilege level (e.g., user, supervisor, hypervisor) and a memory address space, and a boundary is crossed whenever a call (e.g., a system call, a hypercall) is made from one protection domain into another. For example, when application code makes a system call to an operating system, that call crosses a boundary between the protection domains of the application and the operating system.

Within a system virtual machine, the virtual processor's context (e.g., control registers, privilege level) is completely controlled by the VM. In this embodiment, that context is extended to encompass protection domain. As one of ordinary skill in the art will appreciate, the privilege level can affect whether an instruction will execute (e.g. attempting to execute a privileged instruction with only user-level privilege will cause a trap), and also to determine whether a particular page of memory is available during execution of the instruction.

In an embodiment of the invention, a system virtual machine tracks the protection domain under which a collection of virtual ISA (Instruction Set Architecture) or vISA code—code operating under control of a guest operating system of the VM—will appear to execute. That information will be used to generate native ISA (or nISA) code that will operate within the same protection domain.

In one implementation, when an intermediate representation of the vISA code is generated, region nodes corresponding to the code involved in a call are marked with the relevant protection domain. Then, the region nodes corresponding to the caller and callee can be linked across the protection domain boundary and inlined to optimize the call with full knowledge of what occurs on both sides of the boundary.

For example, constant arguments may be exposed to an operating system's argument validation routines, it may be determined that a state is not modified and therefore does not need to be saved to memory, etc. The resulting optimized code can then be converted to a native ISA.

When vISA code is translated or dynamically compiled by the VM, the protection domain is injected into the resulting nISA instructions. For example, in some embodiments a particular bit pattern within a native instruction's format may indicate whether the instruction should operate at user or supervisor level. And, in some embodiments another bit pattern within an opcode may identify a memory address space or be used to lookup a memory address space.

In the emitted native ISA instruction sequence, instructions from different protection domains may be interleaved with the appropriate privilege level (and address space) and executed without issue and without altering or even referencing the privilege level maintained by a hardware processor. It may be noted that the compiler that emits the nISA code is a trusted component of the system virtual machine.

In another embodiment of the invention, inlining is promoted across ISAs (Instruction Set Architectures), in addition to any protection domain boundary that may be crossed. In particular, inlining can be performed even when a call is made from a process executing one ISA to a process executing a different ISA.

FIG. 1 illustrates an environment in which an embodiment of the invention may be implemented. In FIG. 1, VM 110 is a system virtual machine controlling access to host hardware resources 120 (e.g., storage devices, memory, processor, input/output devices).

Any number of virtual or guest operating systems 130 (e.g., operating systems 130a, 130b) execute under the control of VM 110. Any number of applications or other user-level processes 140 may operate under each operating system 130.

For example, application 140a is controlled by operating system 130a, while application 140b is controlled by operating system 130b. Applications 140 execute with user privilege levels and with restricted address spaces compared to their respective operating systems, which execute with supervisor privilege levels.

In the environment of FIG. 1, for reading data from a given input device, such as a keyboard or file, typically only one guest operating system executes a true driver for that resource. Calls from other guest operating systems that need to access that resource must be routed to the operating system that has the driver. For example, in FIG. 1 operating system 130b may control a true driver for a file descriptor or other input resource; operating system 130a may possesses only a stub driver that, when activated, facilitates routing of requests for the resource from application 140a to operating system 130b.

More particularly, in this example, when application 140a attempts to read from the file associated with the file descriptor, a chain of system calls is initiated from application 140a, to operating system 130a, to VM 110, to operating system 130b and finally to hardware 120 (possibly through VM 110 again). Each call between these entities crosses a protection boundary comprising a particular memory address space and privilege level, and calls between operating systems 130 and VM 110 may also cross ISA boundaries.

Whereas, in traditional computing platforms, this chain of calls cannot be optimized through inlining, in the present embodiment of the invention system virtual machine 110 can inline calls across such boundaries.

In FIG. 1, VM 110 is a true virtual machine, in that it comprises dynamic compiler 112 for dynamically translating code at run-time from one ISA (i.e., a virtual ISA or vISA) to another (i.e., a native ISA or nISA). One of ordinary skill in the art will recognize that, in a traditional virtual computing environment, VM 110 might instead be a hypervisor that merely allows one or more sets of code for a given ISA to run on a processor compatible with that ISA (e.g., to host multiple operating systems that use the same ISA). In particular, with a hypervisor, the ISAs of guest operating systems 130 would not differ from the ISA of VM 110, and would match the host processor's ISA.

In embodiments of the invention described herein, operating systems 130 may be written with ISAs different from that of system virtual machine 110. In these embodiments, the guest operating systems are not executed directly, but rather are also dynamically translated into the native ISA. Because both user and operating system processes are translated, the virtual machine can observe what occurs on both sides of a system call from a user-level process to a system-level or supervisor-level process.

Although not shown in FIG. 1, system VM 110 (or dynamic compiler 112) may include a translator and/or interpreter for translating/interpreting vISA code, a code generator for generating nISA code, and/or other components.

In an embodiment of the invention, the process of inlining across protection domain boundaries begins with the generation of an intermediate representation (IR) of code being executed or simulated. As described above, a region node associated with a set of code will be augmented with information describing the memory address space and the privilege level of the process executing the code.

For example, if the process is a user process making a system call to a supervisor-level process, the region node may identify the process' restricted address space and indicate that the privilege level is "user." On the system side of the call across the user process' protection domain boundary, the region node for the code that receives the call will identify the system process' address space and indicate that the process' privilege level is "supervisor" (or hypervisor or other higher level privilege).

When the intermediate representation is reduced to instructions in the native ISA, some or all of those individual instructions will indicate the privilege level at which they should be executed, and will identify the address space to apply. In effect, the privilege setting is moved from dynamic state and made available at compile time. As a result, instead of the entire computing system being limited to one privilege level at a time (e.g., as set in a special hardware processor register) and much overhead processing being required to alter the hardware's privilege level to complete a system call, the call can be organized more efficiently and different instructions having different privilege levels can execute in sequence without incurring the overhead.

Figure 2:
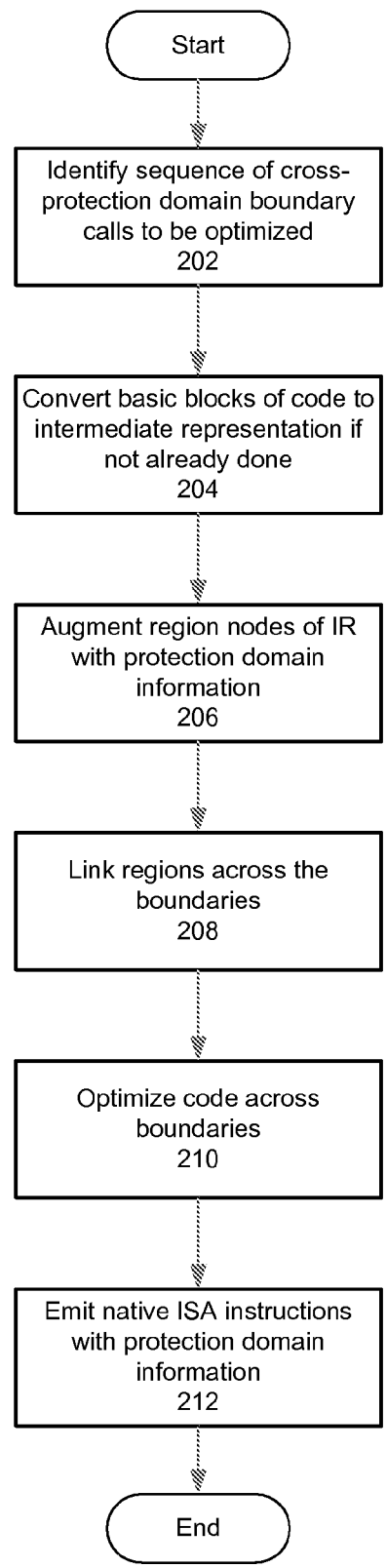
FIG. 2 is a flowchart illustrating one method of performing inlining across protection domain boundaries, in accordance with an embodiment of the invention.

FIG. 2 is a flowchart demonstrating a method of inlining and optimizing a call across a protection domain boundary according to one embodiment of the invention. In this embodiment, one or more calls, traps, interrupts or other events are initiated from processes executing at one privilege level and within one memory address space, to different processes executing at different privilege levels and/or in different memory address spaces.

This method is implemented in an environment such as that illustrated in FIG. 1 and described above. In particular, the environment includes a true virtual machine that hosts one or more guest operating systems, each of which may execute any number of applications or other user-level processes. The vISAs of the guest operating systems may or may not differ from the virtual machine's nISA, and the nISA may be different from the normal ISA of the hardware processor(s) that execute the virtual machine.

In operation 202, a sequence of one or more calls across protection domain boundaries is identified for inlining. The calls may be between user-level processes and supervisor-level processes (e.g. operating systems), between a supervisor-level process and a hypervisor-level process (i.e., the virtual machine), between two applications (e.g., an inter-process call), between operating systems in different address spaces, etc.

In operation 204, virtual ISA program code encompassing the calls is converted to a graph-based intermediate representation (IR) if not already converted. The IR includes nodes for individual instructions and, for each basic block of code, a region node that is coupled to corresponding nodes of instructions within the basic block. Illustratively, the IR may already be available for some or all basic blocks, as a result of a previous invocation of the code, or may be generated now after the code has been invoked one or more times.

In operation 206, for each basic block of the code the corresponding region node in the IR is augmented with information regarding the protection domain in which the basic block executes. In particular, each region node is modified to identify the privilege level at which the block executes or is predicted to execute, as well as the memory address space available to the executing code. The privilege level and address space may be identified directly or by some other value or identifier that can be translated or processed to identify the information.

By augmenting region nodes with the protection domain information, appropriate protection domains can be applied when the IR is reduced to native ISA instructions for execution. The privilege state of the host hardware will not need to be examined or altered during execution because the privilege information will already be available.

In operation 208, the IR is linked or connected across the protection domain boundary separating the source of the call from the destination. For example, the region node associated with a caller region making the call may be updated with an arc connecting it to the first region node within the callee region that receives the call. This links the two regions and helps the virtual machine prepare for optimization across the boundary.

In operation 210, the virtual machine optimizes the code corresponding to the two linked regions (and possibly other preceding and/or following regions). In particular, instruction nodes may be reordered, restructured or even deleted if not needed. For example, prior to an interrupt being issued from an application to an operating system, in the caller region one of the last actions may be to store a value corresponding to the desired system-level action. One of the first actions in the callee region may be to read this value. Optimization may streamline or even eliminate this sequence because the action to be taken by the operating system is known.

As part of operation 210, the dynamic compiler modifies its IR of the program code, or generates a new IR, such that nodes having different protection domains are intermingled. Because each instruction is still coupled to or associated with its region node, its protection domain can be readily identified. In short, optimization of the code path may involve interleaving instructions of different protection domains.

The new or modified IR may collapse code across any number of protection domain boundaries. Thus, the illustrative sequence of calls described above in conjunction with FIG. 1 may be optimized and collapsed into one IR.

In operation 212, the optimized IR is used to emit native ISA instructions having the corresponding protection domain information built in. When the instructions are loaded, the indicated privilege level is set and the indicated address space is applied. The optimization performed in operation 210 may have reordered the instructions and placed instructions from different protection domains in sequence. Regardless, the instructions can still be executed quickly and in their correct domains, without having to change the privilege level of the entire host machine or endure the normal overhead associated with changing from user-level processing to supervisor-level processing or vice-versa.

In different embodiments of the invention, the emitted native ISA instructions may incorporate the protection domain information in different ways. For example, separate opcodes may be used for LOAD operations performed at a user-level of privilege and a supervisor-level privilege. In other embodiments, the nISA instructions may include one or more fields for identifying the privilege level and address space.

After operation 212, the method of FIG. 2 ends.

The illustrated method of FIG. 2 may be performed in its entirety the first time the sequence of calls is invoked, may be performed in its entirety after it is invoked some number of times, or may be performed piecemeal. For example, a simple compilation, translation or interpretation may be performed the first time the code path is executed, and statistics may be gathered to determine which (if any) sequence of calls to inline and optimize. Then the identified sequence of calls may be dynamically compiled (if not already compiled), inlined and optimized. As yet another option, some or all of the method may be applied when the software that features the sequence of calls is installed.

Figure 3:
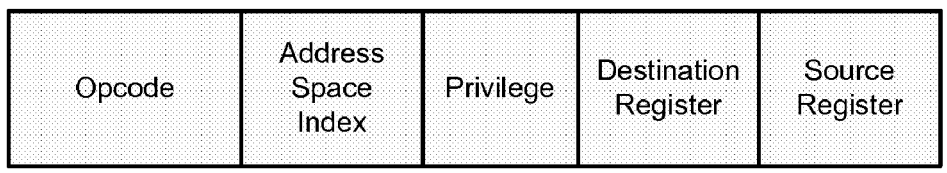
FIG. 3 depicts illustrative formats of instructions in a virtual machine's native instruction set architecture, in accordance with an embodiment of the present invention.
Figure 3:
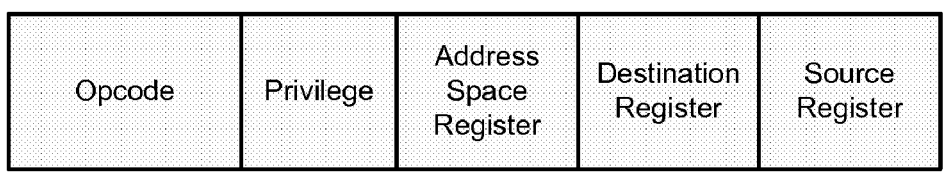
Figure 3:

FIG. 3 demonstrates illustrative formats of the native ISA instructions that may be emitted by the dynamic compiler as it translates the intermediate representation. These formats are exemplary only and not meant to limit the manner in which a native ISA instruction emitted by a virtual machine may incorporate or reveal the protection domain in which the instruction should execute.

Format 310 illustrates a form of native instruction in which the privilege level and address space are identified separately. In this format, the privilege at which the instruction is to execute is executed in one field, while an index of the instruction's address space in another data structure (e.g., a processor table) is stored in a separate field.

Although the illustrated size of the privilege field is one bit (e.g., to indicate either "user" or "supervisor"), in other implementations it may be larger (e.g., to allow "hypervisor" and/or other privileges). Similarly, while the two-bit address space index field allows a lookup of 4 different address spaces, it may be larger in other implementations.

Illustratively, a memory address space ID may be approximately 16 bits wide, thereby allows 64K different address space IDs, although the number that can be referenced at any given time by a given set of code may be limited by the size of the address space index field of the instruction. A memory space ID herein may be used in a Translation Lookaside Buffer (TLB) during the process of translating between a virtual address and physical memory address.

In format 320, the privilege field may be configured similarly (e.g., one bit), but the address space ID is now stored in a general-purpose register and an address of that address space register is stored in an address space register field.

In format 330, the privilege and memory address space are identified via a single, combined field. In one implementation of this format, the field comprises an index to a table in which each entry comprises a privilege level and a memory address space ID. In another implementation, the field comprises an index to a table in which each entry stores a value that comprises a combination of the privilege level and the memory address space ID; illustratively, the privilege may be stored as the high-order bit(s) of the value. In either implementation the number of entries in the indexed table may depend on the size of the privilege and address space ID field.

In another embodiment of the invention, calls between different ISAs (e.g., processes executing with different ISAs) can be inlined and optimized. As a result, within an environment such as that depicted in FIG. 1, if a real device driver is not available for a process executing under a particular vISA, a call can be made to use a real device driver of a different vISA and that call can be inlined and emulated or executed more efficiently.

Within the intermediate representation of program code associated with a call, region nodes are marked with the ISA (e.g., a virtual ISA or vISA) of the corresponding code. The call can then be inlined and optimized as described above, across the boundary between the ISAs (and protection domains).

In one implementation, when a call crosses a vISA boundary, the virtual machine generates separate intermediate representations for each vISA's code. The two IRs may then be merged or translated into another IR, which may be in a format tailored to the host machine or native ISA.

When the VM generates native ISA code from the optimized IR, in addition to configuring the nISA instructions for the correct protection domains, instructions are also configured as necessary to reflect the semantics of the corresponding vISA. For example, memory semantics often differ between ISAs (e.g., SPARC, x86, PowerPC), and the nISA instructions will be configured to ensure the correct semantics are applied (e.g., whether or not to set certain flags).

Depending on the virtual ISAs running under a system virtual machine, different information may be carried forward via region nodes of the IR for use in generating the native ISA instructions. Illustrative parameters include memory endianness (e.g., to convert between big endian and little endian formats), behavior of the memory consistency model, sensitivity to processor modes and control registers, trap semantics (e.g., how to report an exception caused an instruction), etc.

In the resulting set of native ISA instructions, instructions corresponding to one of the vISAs may be interleaved with instructions of the other vISA. Because each native instruction is tailored to capture the semantics, behavior and effects of the corresponding vISAs, the interleaving does not affect the efficiency of the optimized code, even if the instructions also comprise protection domain information for ensuring they operate within the correct domain.

The environment in which a present embodiment of the invention is executed may incorporate a general-purpose computer or a special purpose device such as a hand-held computer. Details of such devices (e.g., processor, memory, data storage, display) may be omitted for the sake of clarity.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules may include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. A computer-implemented method of optimizing a program call between Instruction Set Architectures (ISA) in a system virtual machine, the method comprising:

identifying a program call from a source process under a first ISA to a destination process under a second ISA different from the first ISA, wherein the source process executes in a first protection domain and the destination process executes in a second protection domain different from the first protection domain, wherein each protection domain comprises a combination of a privilege level and an assigned memory address space;

augmenting a first region node of an intermediate representation of code comprising the source process of the program call with information configured to identify the first ISA, wherein augmenting the first region node comprises augmenting the first region node with information regarding a first protection domain at which the source process of the program call executes;
augmenting a second region node of an intermediate representation of code comprising the destination process of the program call with information configured to identify the second ISA;
inlining the first region node and the second region node to optimize the program call; and
emitting instructions for executing the optimized program call.

2. The method of claim 1, wherein said emitted instructions conform to a third ISA different from the first ISA and the second ISA.

3. The method of claim 1, further comprising:
generating the intermediate representation of the code comprising the source process and the code comprising the destination process.

4. The method of claim 3, wherein the intermediate representation is generated before the code comprising the source process and the code comprising the destination process are invoked.

5. The method of claim 1, further comprising:
executing the instructions;
wherein the instructions are executed with behavior matching the behavior of corresponding instructions in the source process or the destination process.

6. The method of claim 1, wherein the method is performed by a system virtual machine comprising a dynamic compiler.

7. The method of claim 1, wherein said emitting comprises:
for a type of instruction that executes differently depending on the ISA with which the instruction conforms, generating a different native form of the instruction for different ISAs.

8. The method of claim 7, wherein the type of instruction is a STORE instruction.

9. The method of claim 7, wherein the type of instruction is a LOAD instruction.

10. A non-transitory computer-readable medium storing instructions that, when executed by a computer, cause the computer to perform a method of optimizing a program call between Instruction Set Architectures (ISA) in a system virtual machine, the method comprising:
identifying a program call from a source process under a first ISA to a destination process under a second ISA different from the first ISA, wherein the source process executes in a first protection domain and the destination process executes in a second protection domain different from the first protection domain, wherein each protection domain comprises a combination of a privilege level and an assigned memory address space;
augmenting a first region node of an intermediate representation of code comprising the source process of the program call with information configured to identify the first ISA, wherein augmenting the first region node comprises augmenting the first region node with information regarding a first protection domain at which the program call executes;
augmenting a second region node of an intermediate representation of code comprising the destination process of the program call with information configured to identify the second ISA;
inlining the first region node and the second region node to optimize the program call; and
emitting instructions for executing the optimized program call.

11. A computer system configured to perform inlining of processes conforming to different Instruction Set Architectures (ISA), the computer system comprising:
a system virtual machine comprising a dynamic compiler;
one or more virtual operating systems configured to execute application code under control of the system virtual machine, wherein each virtual operating system conforms to a different ISA;
a program call from a first set of code operating under a first virtual operating system to a second set of code operating under a second virtual operating system, wherein the source process executes in a first protection domain and the destination process executes in a second protection domain different from the first protection domain, wherein each protection domain comprises a combination of a privilege level and an assigned memory address space; and
a graph-based intermediate representation assembled by the system virtual machine and encompassing the first set of code and the second set of code, the intermediate representation comprising:
for each of the first set of code and the second set of code, a region node configured to identify the set of code's ISA and a protection domain at which the set of code executes;
wherein the system virtual machine is configured to generate, from said intermediate representation, virtual machine-executable instructions reflecting the behavior of original instructions in the first set of code and the second set of code in an ISA different from the ISAs of the original instructions.

12. The computer system of claim 11, wherein the system virtual machine is further configured to optimize said intermediate representation prior to generating said virtual machine-executable instructions.

13. The method of claim 1, wherein augmenting the second region node comprises augmenting the second region node with information regarding a second protection domain at which the destination process of the program call executes or is predicted to execute.

14. The method of claim 13, wherein the second protection domain is different from the first protection domain.

15. The method of claim 1, wherein augmenting the first region node further comprises augmenting the first region node with information that identifies a memory address space available to the source process of the program call.

\* \* \* \* \*